(12) United States Patent
Ritter et al.

(10) Patent No.: US 8,616,945 B2
(45) Date of Patent: Dec. 31, 2013

(54) CORN MOG SEPARATOR

(75) Inventors: Aaron Scott Ritter, Milan, IL (US); Daniel Stephen Hoffman, East Moline, IL (US)

(73) Assignee: Deere & Company, Moline, IL (US)

( * ) Notice: Subject to any disclaimer, the term of this patent is extended or adjusted under 35 U.S.C. 154(b) by 347 days.

(21) Appl. No.: 12/608,674

(22) Filed: Oct. 29, 2009

(65) Prior Publication Data

US 2011/0070931 A1   Mar. 24, 2011

Related U.S. Application Data

(60) Provisional application No. 61/244,667, filed on Sep. 22, 2009.

(51) Int. Cl.
*A01F 12/48* (2006.01)
(52) U.S. Cl.
USPC ............................. 460/44; 460/111; 460/112

(58) Field of Classification Search
USPC ............... 460/13, 14, 18, 37, 42, 44, 97–100, 460/111–115, 119
See application file for complete search history.

(56) References Cited

U.S. PATENT DOCUMENTS

| | | | | | |
|---|---|---|---|---|---|
| 1,764,040 | A | * | 6/1930 | Edwards, Jr. | 460/119 |
| 1,831,216 | A | * | 11/1931 | Wickersham | 460/100 |
| 2,120,641 | A | * | 6/1938 | Dieterich | 460/45 |
| 5,833,533 | A | * | 11/1998 | Roberg | 460/112 |
| 6,416,405 | B1 | * | 7/2002 | Niermann | 460/79 |
| 6,688,971 | B2 | * | 2/2004 | Buermann et al. | 460/112 |
| 7,731,578 | B2 | * | 6/2010 | Birrell et al. | 460/100 |
| 2008/0248843 | A1 | * | 10/2008 | Birrell et al. | 460/112 |
| 2010/0248801 | A1 | * | 9/2010 | Birrell et al. | 460/100 |
| 2010/0311481 | A1 | * | 12/2010 | Ritter | 460/112 |

* cited by examiner

*Primary Examiner* — Alicia Torres (57) ABSTRACT

A corn MOG separator for an agricultural combine having a chopper for chopping MOG, the corn MOG separator being located after the chopper in the MOG flow stream and having a separating chamber for receiving the MOG and separating the lighter from the heavier components, the chamber having a mechanical decelerator for mechanically decelerating the corn MOG.

11 Claims, 6 Drawing Sheets

CORN MOG SEPARATOR

RELATED APPLICATIONS

This application claims priority to U.S. Provisional Application No. 61/244,667, which was filed on 22 Sep. 2009 and is incorporated herein by reference for all that it teaches.

FIELD OF THE INVENTION

The invention relates to agricultural harvesters. More particularly it relates to cleaning elements for agricultural harvesters. Even more particularly it relates to attachments for agricultural harvesters for cleaning corn cobs.

BACKGROUND OF THE INVENTION

Agricultural combines are configured to travel through an agricultural field, cutting the crop plants loose from the field, and gathering them. They also strip the crop portion (e.g. the grain) from the rest of the crop plant and discard the unwanted portion (also known as "material other than grain" or "MOG").

Corn is harvested using an agricultural combine with a corn harvesting head or "corn head" attached on the front end thereof. The ears of corn are separated from the plant stalk itself, and are carried backwards into a threshing separating and cleaning system within the agricultural combine. In the combine the kernels of corn are separated from the corn cobs and are stored in a grain tank located in an upper portion of the agricultural combine.

The corn cobs and corn husks are then transmitted to a chopper disposed at the lower rear portion of the agricultural combine where they are chopped into small pieces, approximately 2 to 6 cm long, and are ejected from outlet of the chopper at the rear of the combine and spread over the ground.

In recent years, scientists have developed uses for corn cobs for such things as firing boilers or creating ethanol, plastics and other materials. It is desirable therefore to collect the corn cob pieces. It is not generally desirable to collect the husks. The technical problem, therefore, is providing some means for separating the corn cobs from the corn husks. Is also desirable to further direct the corn cob pieces to a storage location and to spread the husks over the ground.

US patent publication number 2009/0113867 describes a system for separating post-chopper MOG into lighter and heavier portions using an air blast. In this arrangement, the combine chopper empties into a conduit, which empties into a first blower 14. The first blower 14 accelerates the MOG (which is already traveling very fast as it exits the chopper) and sends it up a chute 16 which empties into a wagon as the agricultural combine travels through the field. A second blower 22 is provided to provide a cross flow of air across and through the flow path of MOG established by the chopper and the first blower. This cross flow of air is of sufficient speed to blow the lighter material (i.e. the corn husks) out of the MOG flow path and permit the heavier portion of the MOG (i.e. the chopped corn cobs) to continue onward through chute 16 into a collection vehicle 52. The lighter material ejected from the MOG flow is then spread over the ground, rather than collected in the vehicle 52

US patent publication number 2008/0248843 describes a system of dividing post-chopper MOG into two flow streams of variable proportions. The system includes a selectively steerable conduit 125 located between the combine chopper 118 and the blower 126 (described in US 2009/0113867) to separate a portion of the MOG that leaves the chopper and continues on to the blower. In this arrangement, the steerable conduit 125 has a flow dividing edge that is generally horizontal and moves up and down to mechanically direct the flow of material either into the blower 126 or downward toward the ground, depending upon the position to which it has moved.

In US 2009/0113867, the function of the air is to separate the flow of MOG based on its size, wind resistance, and density. When experiencing the air blast from the second blower 22, the denser materials, such as corn cobs, will continue through the conduit and into the vehicle 52. The lighter materials, such as corn husks, will be blown out of the conduit and directed over the ground.

In US 2008/0248843, the function of the conduit is to divide the flow of MOG into two streams. It does not separate the MOG flow into lighter or heavier portions.

Both of these arrangements suffer from a similar problem. Whether steered by a secondary air blast, or steered by movable conduit, the lighter material (i.e. the corn husks) is traveling so fast between the chopper and the blower that the blast of air is insufficient to steer it out of the vehicle entirely. Instead, the lighter material accumulates on the edge of the conduit that splits the flow, causing the corn husks to "hairpin" on the edge of the conduit and eventually plug the conduit.

Experimentation indicates that the problem is a function of the speed of the MOG flow traveling from the chopper through the first blower, and then up the chute and into the accompanying vehicle. At the high rates of speed the material travels from the chopper to the blower, there is a limited amount of time during which a cross flow air stream can separate the cobs from the husks. Given the limited amount of time for separation, the cross flow air separation arrangement of US 2009/113,867 A1, requires a substantial supply of high-speed air, and thus a powerful fan.

What is needed is a way to reduce the speed of the MOG, and while the speed is reduced, to separate the MOG into its lighter and heavier components using gravity as well as a secondary airflow.

It is an object of this invention to provide such a system.

SUMMARY OF THE INVENTION

In the description below, the terms "forward", "front", "ahead" "rear", "rearward", "behind" or other similar terms are defined in terms of the direction of travel of the agricultural combine in its straight line travel through an agricultural field during harvesting operations.

The terms "lateral", "transverse", "side-to-side" or other similar terms indicate a relative direction or orientation that is generally horizontal and perpendicular to the front-to-rear direction described in the previous paragraph.

In accordance with a first aspect of the Invention, a corn and MOG separator includes a housing having a decelerating and separating chamber for decelerating and separating corn MOG into a cob portion and a husk portion, the chamber having a first inlet configured to receive a flow of corn MOG including cobs and husks from an agricultural combine chopper, a second inlet configured to receive a flow of environmental air from outside the combine, a first outlet for transmitting non-cob MOG from the chamber, and a second outlet for transmitting cob MOG from the chamber.

In accordance with a second aspect of the invention, a corn MOG separator for an agricultural combine having a chopper for chopping MOG is provided, the separator comprising a housing defining a separating chamber for separating the cobs from the husks, the housing having a MOG inlet disposed to receive a stream of chopped corn cobs and corn husks from the chopper and to convey them into the separating chamber, the housing further having an air inlet configured to introduce a stream of separating air into the separating chamber and into corn MOG in said separating chamber and an air outlet disposed to remove air with entrained husks from the separating chamber; a fan configured to draw separating air into the air inlet, through the corn MOG and out the air outlet with entrained husks; and a mechanical decelerator disposed in the separating chamber and configured to decelerate the corn MOG in the chamber sufficient to let the stream of air and gravity, working in the opposite direction as the air flow, to separate the husks from the cobs. The fan may be disposed to suck the separating air upward through the corn MOG. The corn MOG separator may further comprise a mechanical conveyor disposed at the bottom of the chamber to convey cobs out of the separating chamber. The mechanical conveyor may be an auger disposed at the bottom of the separating chamber. The corn MOG separator may further comprise a MOG distributor configured to spread MOG over the ground, and an operator adjustable conduit disposed between the chopper and the MOG inlet and configured to separate the stream of MOG from the chopper into a first portion of corn plus husks directed into the MOG inlet and a second portion of corn plus husks into the MOG distributor. The MOG inlet may be disposed along a front side of the separating chamber and the mechanical decelerator may be disposed at the rear side of the separating chamber. The mechanical decelerator may be suspended inside a rear wall of the separating chamber and may comprise a sheet of rubber, plastic, metal or lengths of chain. The mechanical decelerator may extend across substantially the entire width of the separating chamber. The mechanical decelerator may be suspended from a rod member. The mechanical conveyor may be an auger disposed at the bottom of the separating chamber. The auger may extend transversely with respect to the combine across substantially the entire width of the separating chamber. The width of the separating chamber may be substantially the same as the width of an outlet of the chopper.

DESCRIPTION OF THE PREFERRED EMBODIMENTS

In the description below, like numbers refer to like elements in the various embodiments of the invention.

Figure 1:
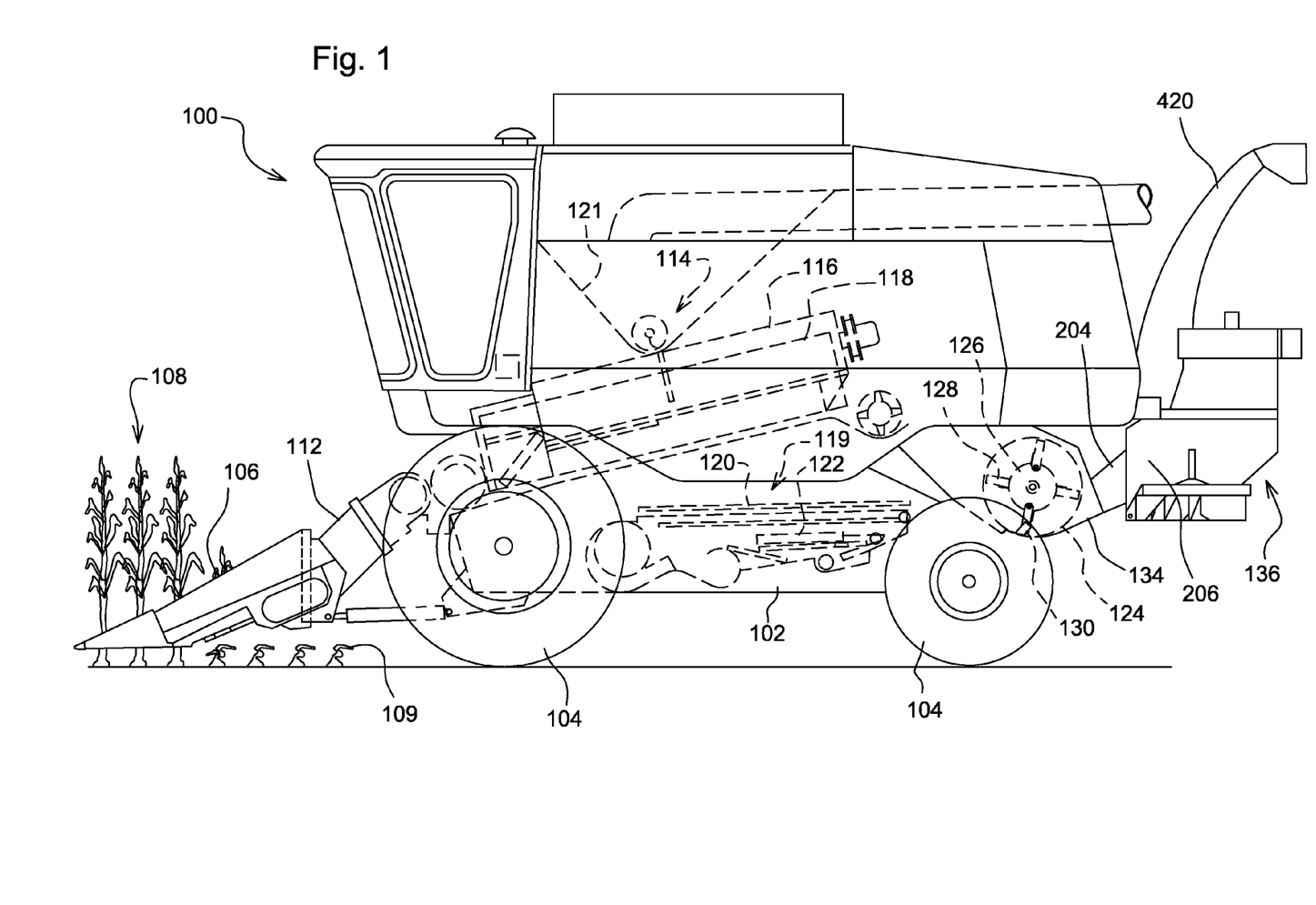
FIG. 1 is a side view of an agricultural harvester with a corn MOG separator attached thereto.

FIG. 1 is a side view of an agricultural harvester in accordance with the present invention. In the arrangement shown in FIG. 1, an agricultural combine 100 has a chassis 102 supported by wheels 104 to carry the combine over the ground. A harvesting head 106 is mounted on the front end of the combine to gather corn plants 108 growing in the agricultural field and strip the ears of corn from the plant stalks. The plant stalks 109, now stripped of their ears of corn, are left on the ground. The ears of corn are carried through the harvesting head 106 and rearward through a feederhouse 112 which supports the harvesting head on the combine. Once the ears pass through the feederhouse they go into a threshing system 114 which includes a rotor 116 disposed inside a concave 118. The rotor rotates within the concave thereby threshing and separating corn kernels from the corn cobs and corn husks. The corn kernels fall downward into an oscillating cleaning shoe 119 which passes them through a sieve 120 and chaffer 122, whereupon they are collected and conveyed upward into a grain tank 121. Corn MOG residue including corn cobs and corn husks pass rearward through the rotor and concave arrangement and are deposited in a chopper 124.

Chopper 124 includes a chopper rotor 126 with pendulous knives 128 affixed thereto that rotates at high speed. The pendulous knives 128 are interleaved with a row of stationary knives 130 which extend inward into the rotor housing 132. The interaction of the pendulous knives 128 and the stationary knives 130 chops the corn cobs and corn husks into short pieces. Chopper rotor 126 generates an airflow that carries the entrained chopped corn MOG rearward through a chopper outlet 134.

In traditional combines, the chopped MOG is then distributed over the ground by steering vanes or by rotating spreaders. In the present arrangement, however, a corn MOG separator 136 is mounted to the rear of the combine in a position to receive the chopped corn MOG from chopper outlet 134.

Figure 2:
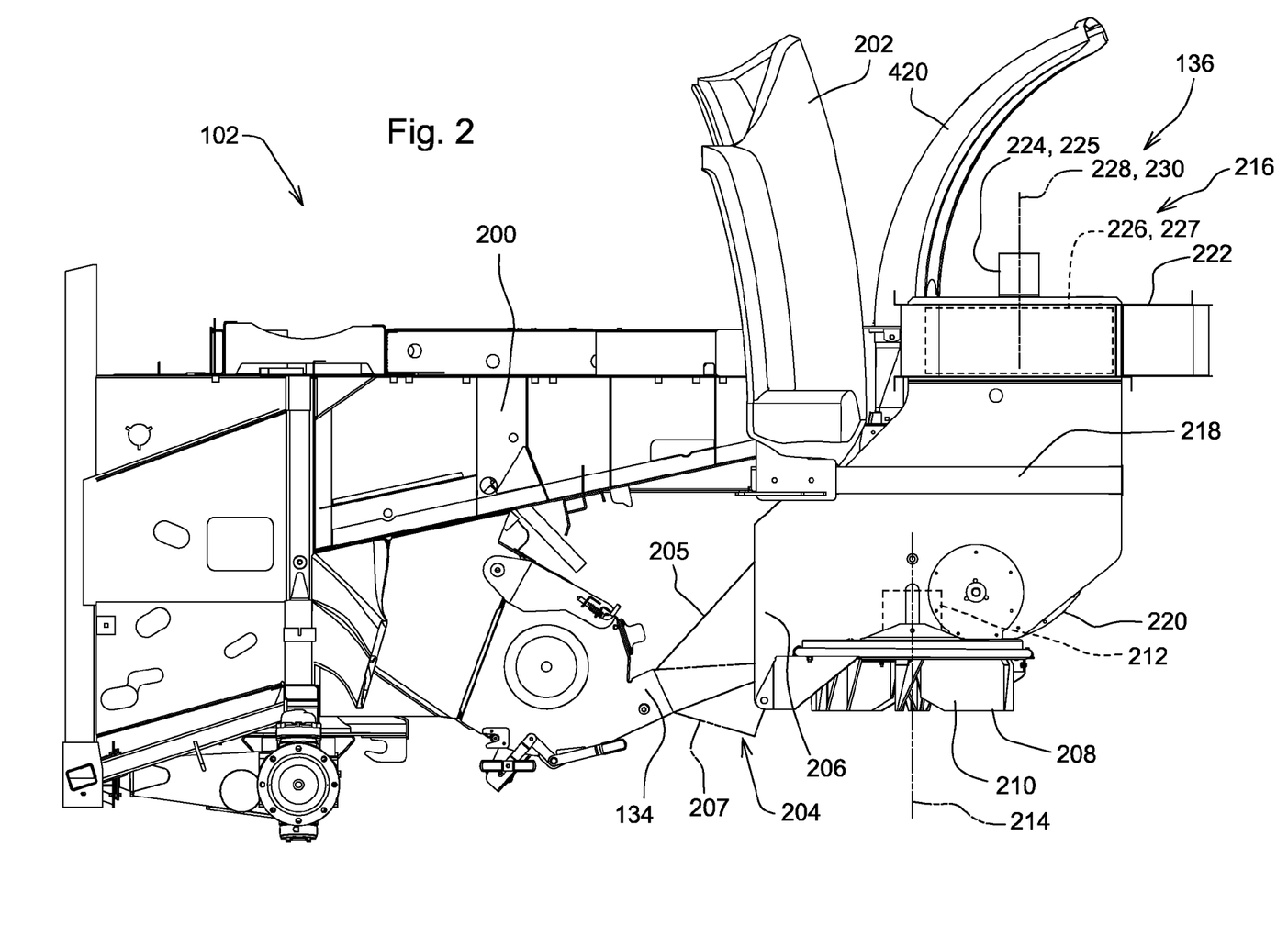
FIG. 2 is a fragmentary left side detail view of the agricultural harvester of FIG. 1 with the plastic side covers of the combine removed to show the mounting arrangement of the corn MOG separator to the chassis of the agricultural combine.

Referring now to FIG. 2, corn MOG separator 136 is bolted to and supported on rear portion 200 of the combine chassis 102. For convenience of discussion, rear portion 200 of the chassis is shown with the side panels of the combine 100 removed. A cut off portion of rear panel 202 is attached to the combine chassis 102. The pulley arrangement and jack shaft for driving the corn cob auger have also been removed.

A conduit 204 (preferably steerable) is disposed between the chopper outlet 134 and corn MOG separator 136. Conduit 204 communicates the chopped MOG expelled from chopper outlet 134 to the inlet 206 of the corn MOG separator. Chopper outlet 134 has a lateral width of between 1-2 m and a height of 10-20 cm, thereby defining a vertically narrow and laterally elongate aperture through which the chopped corn MOG passes.

The conduit is repositionable by the operator from a first operating position 205 (shown in solid lines) in which all corn MOG is communicated to the corn MOG separator 136, to at least a second position 207 (shown in dashed lines) in which a some or all of the corn MOG is communicated to a mechanical distributor 208. Mechanical distributor 208 is fixed to the bottom of corn MOG separator 136 to direct the flow of corn MOG received from chopper outlet 134 over the ground.

In one arrangement, shown here, mechanical spreader 208 includes two counter-rotating rotary impellers 210 with paddles that are driven in rotation by two hydraulic motors 212. Hydraulic motors 212 rotate rotary impellers 210 about substantially vertical axes 214 to spread the corn MOG in a wide and generally horizontal swath across the ground behind the agricultural combine 100. Alternatively, mechanical distributor 208 may include (either in place of or in addition to rotary impellers 210) other non-motorized devices such as one or more stationary vanes that steer the corn MOG outward in both directions over the ground in generally the same manner as the rotary impellers 210.

A separator fan 216 is fixed to the upper portion of a corn MOG separator housing 218 to create a flow of air upward through the corn MOG that flows from the inlet 206 of corn MOG separator 136 into a central chamber in housing 218.

Separator fan 216 moves air upward through an air inlet 220 disposed adjacent to the bottom of corn MOG separator housing 218. Separator fan 216 draws air for separating the corn MOG from the ambient environment outside the agricultural combine 100 into inlet 220, upward through an internal chamber in housing 218, into separator fan 216 itself, and then expels the air out of the corn MOG separator through outlet 222 of separator fan 216. Separator fan 216 includes two motors 224, 225 disposed adjacent to each other in a transverse relationship that drive impellers 226, 227 in rotation about generally vertical axes 228, 230 (see FIG. 3).

Figure 3:
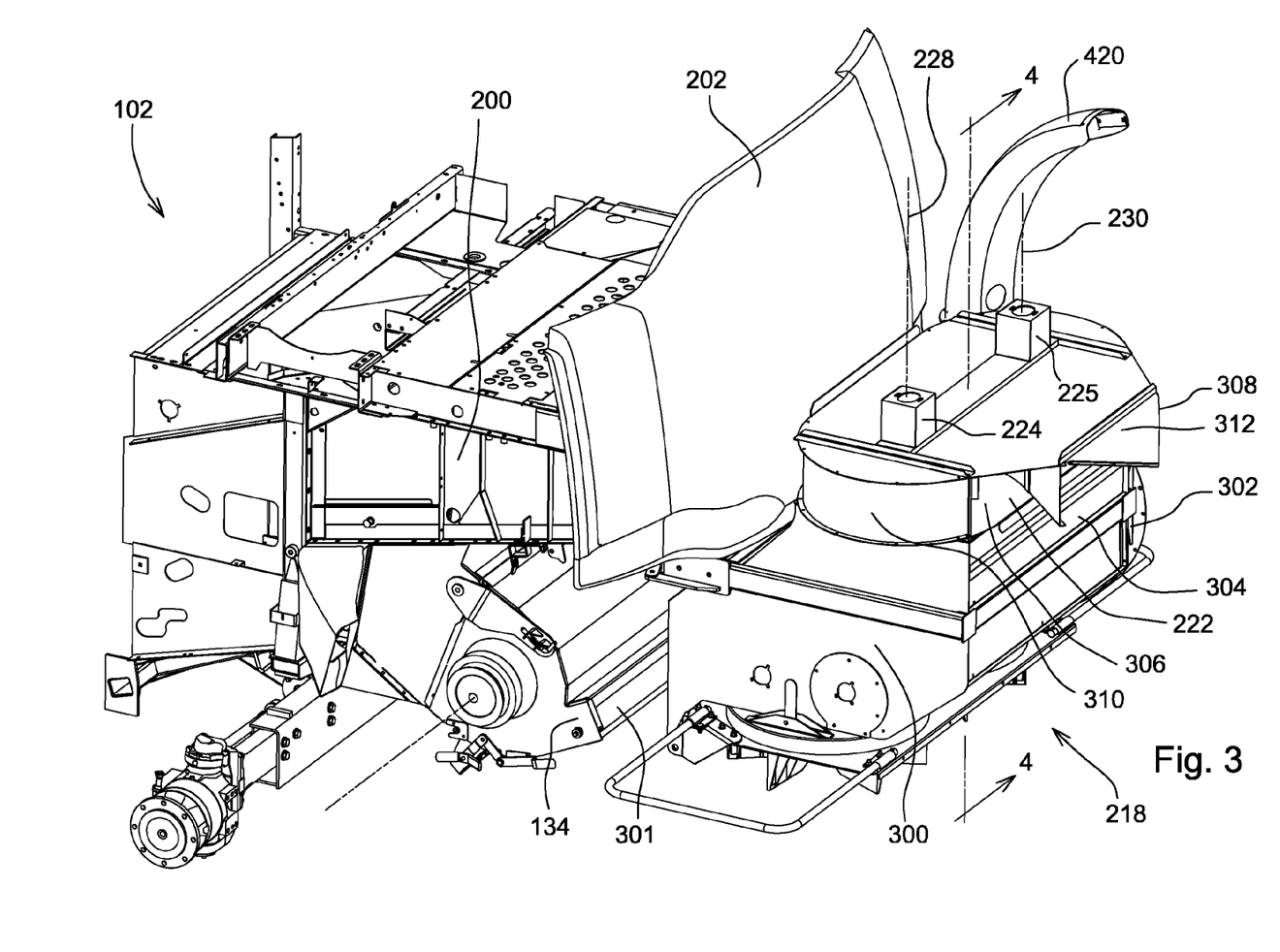
FIG. 3 is a perspective view of the FIG. 2 arrangement.

Referring now to FIG. 3, motors 224, 225 of separator fan 216 are disposed adjacent to one another in a side-by-side relation such that their axes of rotation 228, 230, respectively, are generally parallel and laterally spaced apart from one another.

Corn MOG separator 136 housing 218 is generally in the form of a hollow box comprised of vertical and fore-and-aft extending planar end walls 300, 302 to which generally vertically and laterally extending rear walls 304 and front walls (not shown) are fixed. The spacing between the left and right end walls 300, 302 is preferably substantially the same as the width (e.g. 1-2 m) of opening 301 defined by chopper outlet 134. In this manner, corn MOG can be directed generally rearward as a fast-flowing planar stream into the separator housing 218 without disrupting the flow of corn MOG in a lateral direction (i.e. steering part of the flow to one side of the combine or the other). This lateral steering can cause unnecessary lateral mixing, turbulence, and therefore the undesirable injection of corn cobs into separator fan 216.

Outlet 222 of separator fan 216 preferably includes an outlet for each of the motor-driven impellers. These are shown in FIG. 3 as outlet 306 and outlet 308, which are mirror images of each other, in which outlet 306 directs the flow of material from the impeller driven by motor 224 in a rearward direction and to the left side of agricultural combine 100, and outlet 308 directs the flow of material from the impeller driven by motor 225 in a rearward direction and to the right side of agricultural combine 100. Outlets 306, 308 are defined by openings in generally cylindrical and horizontal housings 310, 312, that enclose impellers 226, 227, respectively.

Figure 4:
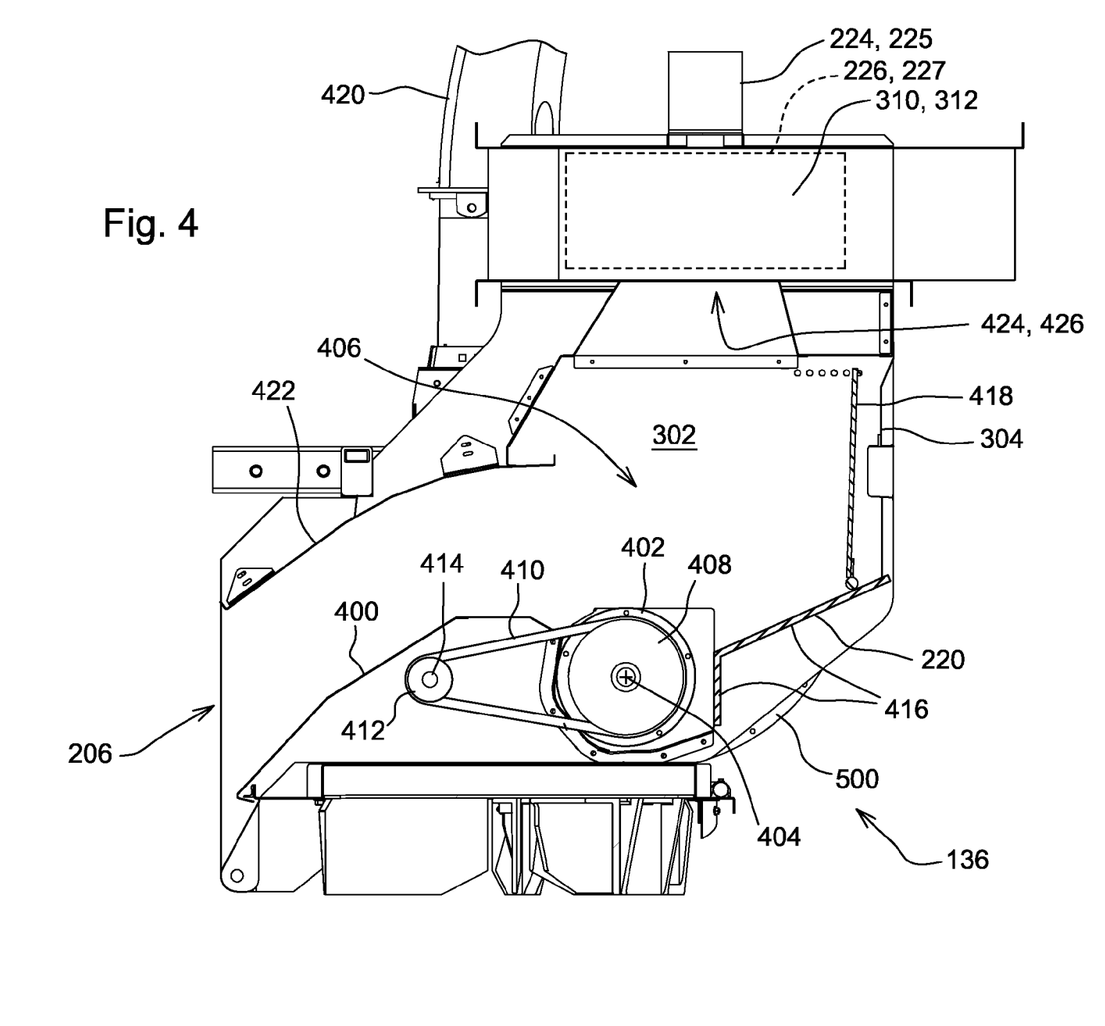
FIG. 4 is a left side view of the corn MOG separator of FIG. 3 showing the internal construction of the separating chamber by removing the left side end wall 300.

FIG. 4 illustrates a cutaway of corn MOG separator housing 218, indicating the internal construction of the housing and the flow of corn MOG during processing. The inner surfaces of housing 218 define a separating chamber 406, including the inlets and outlets for air and MOG. The corncob auger, its pulley, the jack shaft and its pulley have been superimposed on the lower portion of the Figure.

A first planar sheet 400 forms the bottom surface of inlet 206. It is removably fixed to and extends between end walls 300, 302. Planar sheet 400 extends from inlet 206 in a generally curved fashion until it abuts a top portion of corn cob auger 402. Planar sheet 400 extends in a curve around the front side of corn cob auger 402 to partially define a channel in which corn cob auger 402 rotates.

Corn cob auger 402 is a spiral auger having a generally horizontal and laterally extending axis of rotation 404 that is disposed above the floor of separating chamber 406. Corn cob auger 402 is driven by a pulley 408 that is mounted to the left end of the shaft of auger 402 extending outside end wall 300. Pulley 408 is driven by belt 410. Belt 410 is driven by pulley 412 which is mounted on the left end of a jack shaft 414.

Jack shaft 414 extends across the width of corn MOG separator 136 from end wall 300 to end wall 302 just underneath planar sheet 400 and outside the flow path of corn MOG. Jack shaft 414 is supported on end walls 300, 302 of housing 218 for rotation by a gearbox (See FIG. 5) that is disposed just outside the right end wall 302.

An air permeable panel 416 defines a portion of the floor and the rear wall 304 of separating chamber 406 and also functions as air inlet 220. It extends between end walls 300 and 302 to which it is fixed. Air permeable panel 416 serves to retain corn cobs within separating chamber 406, and to provide a low-air resistance inlet for ambient air that is drawn into separating chamber 406 by separating fan 216. Air permeable panel 416 is preferably a planar sheet of material, such as metal, that is provided with a plurality of apertures extending therethrough to permit the passage of air while denying the passage of chopped corn cobs. It may be a mesh or screen, such as a metal mesh or screen. It may comprise a plurality of interlocking rods, or of interconnected ribs and rods, such as a typical construction of a concave for a rotor in an agricultural combine. It may also comprise expanded metal or pierced metal.

The size of the apertures in panel 416, however they are defined, are preferably configured to pass a spherical object no larger than 4 cm in diameter. More preferably they are configured to pass a spherical object no larger than 3 cm in diameter. Even more preferably they are configured to pass a spherical object no larger than 2.5 cm in diameter.

To provide strength sufficient to contain the cobs, yet also provide minimal air resistance to the flow of air for separating the cobs and husks, the ratio of the total membrane aperture area versus the overall surface area of the membrane should be 0.5 or greater, preferably 0.7 or greater, and more preferably 0.8 or greater.

Rear wall 304 extends laterally between the two end walls 300, 302 and extends vertically from the top of air permeable panel 416 to just underneath separating fan 216.

A mechanical decelerator 418 is disposed across substantially the entire lateral width of the separating chamber 406 just inside the rear wall 304. Mechanical decelerator 418 is spaced just far enough ahead of rear wall 304 that it can absorb the kinetic energy of the corn cobs when it is hit and permit them to fall generally downward toward corn cob auger 402 where they will rest until they are gathered by corn cob auger 402. If the kinetic energy of the corn cobs is not absorbed, the cobs will bounce off the rear wall and return toward the inlet colliding with other cobs, causing significant turbulence, and even directing corn cobs upward into the inlet of separating fan 216 where they could jam the fan or be mistakenly ejected from the corn MOG separator 136 and thrown onto the ground.

Mechanical decelerator 418 may be formed of rubber sheet, plastic sheet, wire mesh, chain, a chain wall, a metal sheet, steel, urethane, a pierced metal sheet, and expanded metal sheet or other media that is configured to absorb the impact of corn cobs thrown into separating chamber 406.

The deflection sheet 418 is disposed directly in the path of corn MOG entering separating chamber 406 from inlet 206 on the side opposite inlet 206. Corn cobs in corn MOG entering separating chamber 406 travel across the chamber and impact deflection sheet 418.

A plurality of mounting points is shown in FIG. 4 as a series of holes in end walls 300. An identical row of holes in a mirror image position is formed in end wall 302. These mounting points support a rod that extends substantially across the entire width of the separating chamber and from which the mechanical decelerating material is suspended. The mechanical decelerator 418 is thereby suspended as a sheet across substantially the entire width of the chamber 406 and can be positioned either closer to or farther from the rear wall of the chamber by selecting a different set of mounting points (e.g.

the holes) in the horizontal array. This permits the mechanical accelerator to be variously adjusted to different positions based upon the speed of the chopper rotor, the crop being harvested, and the size of the chopped cob pieces to be decelerated.

The corn cobs in separating chamber 406 pass through the stream of air that is pulled into and upward through separating chamber 406 from air inlet 220 to separating fan 216. This upward airflow through the chamber and through the now (relatively) slowly falling corn cobs serves to more effectively separate the corn cobs from corn husks and other low density residue portions of corn MOG (for example dust, chaff, leaves, and the like).

Once the cobs have fallen into the bottom of separating chamber 406 The movement of corn cob auger 402 and the angle of inlet 220 and sheet 400 directs them toward the right end of the separating chamber 406, where they pass-through an aperture in the bottom of separating chamber 406 into a blower (not shown). The blower accelerates the corn cobs, providing them with enough kinetic energy that they travel up a curved exit chute 420 and into a collection vehicle such as a truck, cart or wagon traveling alongside the agricultural combine 100.

A second planar sheet 422 defines the upper wall of MOG inlet 206, from conduit 204 to separating chamber 406. Planar sheet 422 extends from and is fixed to end wall 300 and wall 302 to define (in conjunction with planar sheet 400 and end walls 300, 302) a generally rectangular conduit having substantially the same width in a transverse direction and the same height as outlet 134 of the chopper.

Planar sheet 422 is configured to guide the stream of corn MOG entering the inlet 206 into a generally horizontal flow path as it enters separating chamber 406. Once the stream of corn MOG is inside separating chamber 406, it is traveling generally horizontally and also generally perpendicularly to the separating airflow (i.e. the airflow generated by separating fan 216) the separating airflow traveling generally vertically upward through separating chamber 406 from air inlet 220 to the inlet of separating fan 216.

The housings 310, 312 that enclose impellers 226, 227 are fixed to the top of separating chamber 406 and define the top of the separating chamber. The housings 310, 312 have downwardly facing central axial openings 424, 426, respectively, that receive air from separating chamber 406 and conduct it into impellers 226, 227 near the central axes 228, 230, respectively, of the impellers.

Figure 5:
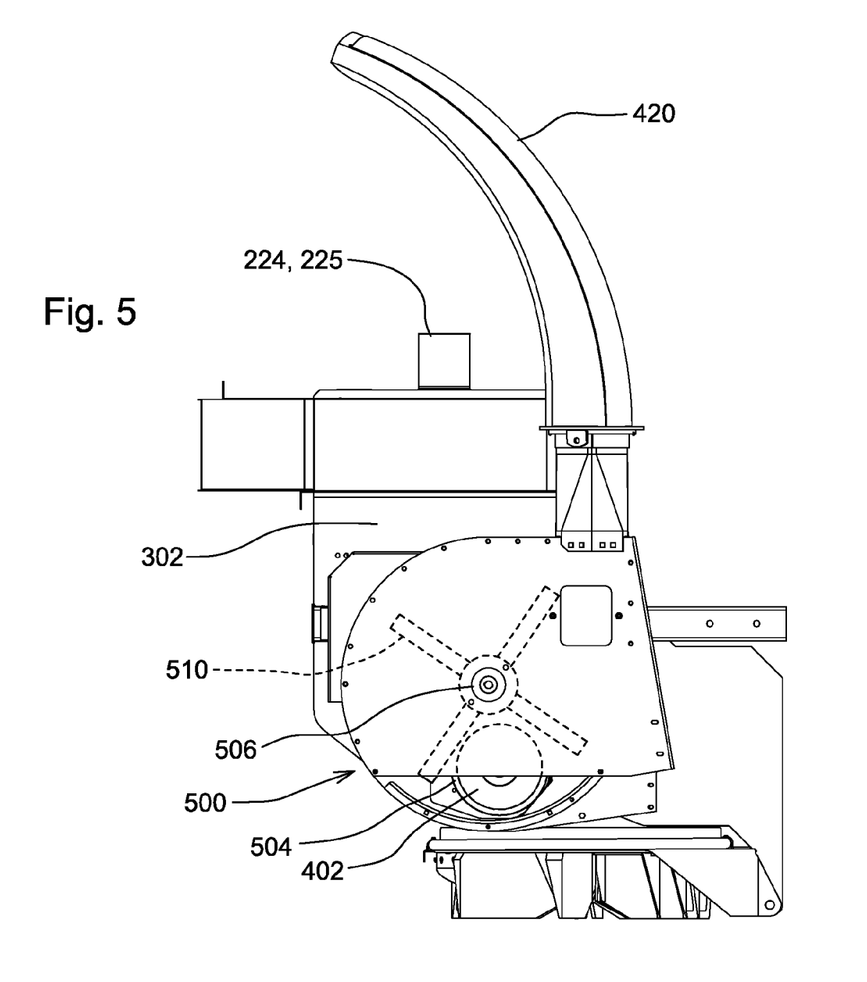
FIG. 5 is a right side view of the corn MOG separator.
Figure 6:
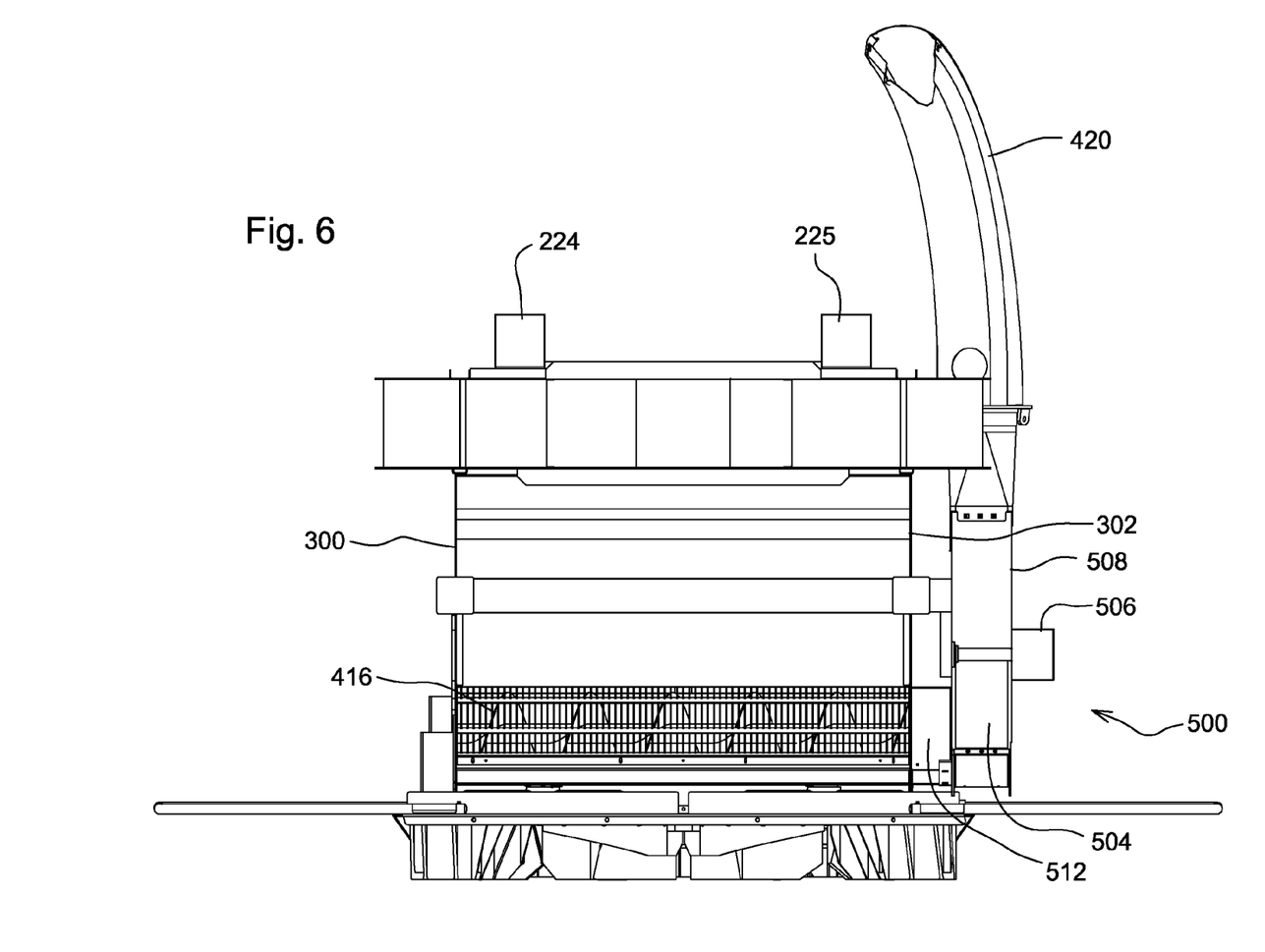
FIG. 6 is a rear view of the corn MOG separator.

Referring now to FIGS. 5-6, a delivery conveyor 500 is fixed to the right end of corn MOG separator housing 216. Corn cob auger 402 draws the corn cobs to the right across the bottom of separating chamber 406 and through an aperture 502 (that is circular, concentric with auger 402, and has a slightly larger diameter than the diameter of the auger flights) into a lower portion of generally cylindrical housing 504 of delivery conveyor 500.

A hydraulic motor 506 fixed to the outer planar wall 508 of housing 504 and drives an impeller 510 at high speed. Impeller 510 sweeps the corn cobs entering housing 504 through aperture 502, around the inner surface of housing 504 and out through an exit chute 420.

Motor 506 is coupled to a shaft that extends through housing 504 and into a gearbox 512 that is disposed between delivery conveyor 500 and end wall 302. Gearbox 512 provides a gear reduction and drives jack shaft 414 at a reduced speed. Jack shaft 414, as explained above, extends across the width of corn MOG separator housing 218, through sidewall 300, and is coupled to pulley 412 to drive auger 402 at an even slower speed.

Having described the preferred embodiment, it will become apparent that various modifications can be made without departing from the scope of the invention as defined in the accompanying claims.

The invention claimed is:

1. A corn MOG comprising cobs and husks separator for an agricultural combine having a chopper for chopping MOG, the separator comprising:
   a housing defining a separating chamber for separating the cobs from the husks, the housing having a MOG inlet disposed to receive a stream of chopped cobs and husks from the chopper and to convey them into the separating chamber, the housing further having an air inlet configured to introduce a stream of separating air into the separating chamber and into the MOG in said separating chamber and an air outlet disposed to remove air with entrained husks from the separating chamber;
   a fan configured to draw separating air into the air inlet, through the MOG and out the air outlet with entrained husks;
   a mechanical decelerator disposed in the separating chamber and configured to decelerate the MOG in the chamber sufficient to let the stream of air separate the husks from the cobs; and
   a MOG distributor configured to spread MOG over the ground, and an operator adjustable conduit disposed between the chopper and the MOG inlet and configured to separate the stream of MOG from the chopper into a first portion of cobs and husks directed into the MOG inlet and second portion of cobs and husks into the MOG distributor.

2. The corn MOG separator of claim 1, wherein the fan is disposed to suck the separating air upward through the corn MOG.

3. The corn MOG separator of claim 1, further comprising a mechanical conveyor disposed at the bottom of the chamber to convey cobs out of the separating chamber.

4. The corn MOG separator of claim 3, wherein the mechanical conveyor is configured to convey corn cobs laterally across the bottom of the separating chamber to a corn cob outlet disposed on one side of the separating chamber.

5. The corn MOG separator of claim 1, wherein the MOG inlet is disposed along a front side of the separating chamber and the mechanical decelerator is disposed at the rear side of the separating chamber.

6. The corn MOG separator of claim 1, wherein the mechanical decelerator is suspended inside a rear wall of the separating chamber and comprises a sheet of rubber, plastic, metal or lengths of chain.

7. The corn MOG separator of claim 1, wherein the mechanical decelerator extends across substantially the entire width of the separating chamber.

8. The corn MOG separator of claim 1, wherein the mechanical decelerator is suspended from a rod member.

9. The corn MOG separator of claim 3, wherein the mechanical conveyor is an auger disposed at the bottom of the separating chamber.

10. The corn MOG separator of claim 9, wherein the auger extends transversely with respect to the combine across substantially the entire width of the separating chamber.

11. The corn MOG separator of claim 1 wherein the width of the separating chamber is substantially the same as the width of an outlet of the chopper.

* * * * *